Feb. 15, 1944. H. P. SMITH 2,341,824
TRACTOR MOUNTED IMPLEMENT
Filed Oct. 22, 1941 4 Sheets-Sheet 1

Inventor:
Hiram P. Smith.
By Paul O. Pippel.
Atty.

Feb. 15, 1944. H. P. SMITH 2,341,824
TRACTOR MOUNTED IMPLEMENT
Filed Oct. 22, 1941 4 Sheets-Sheet 2
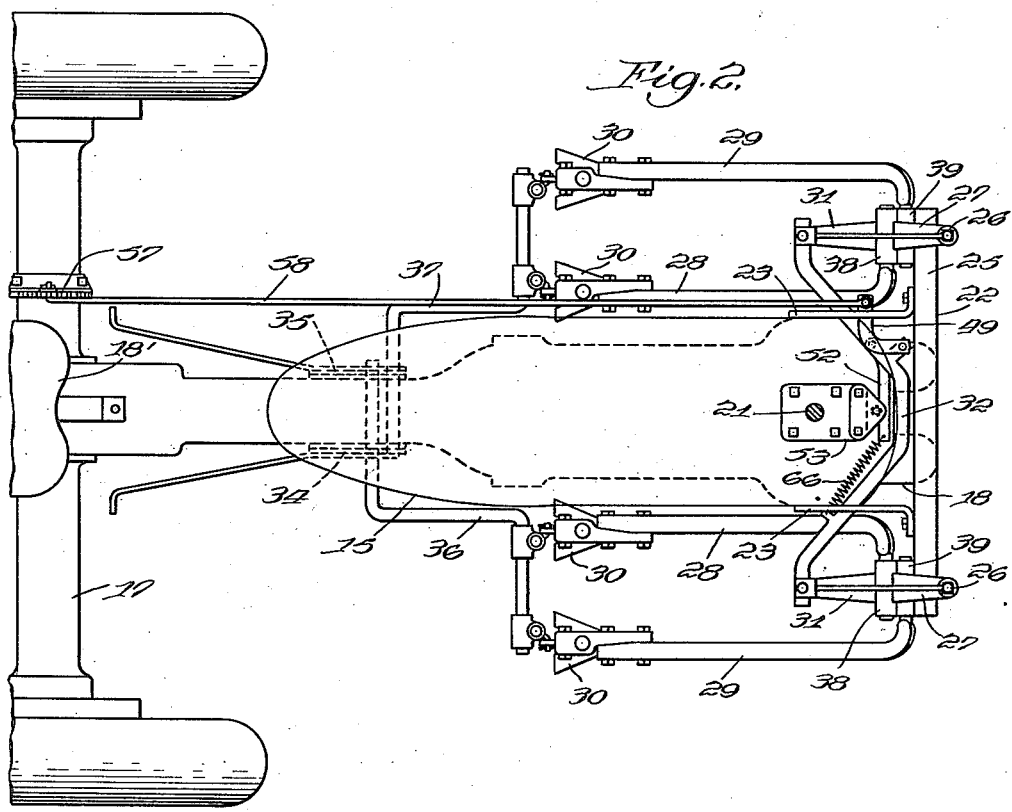
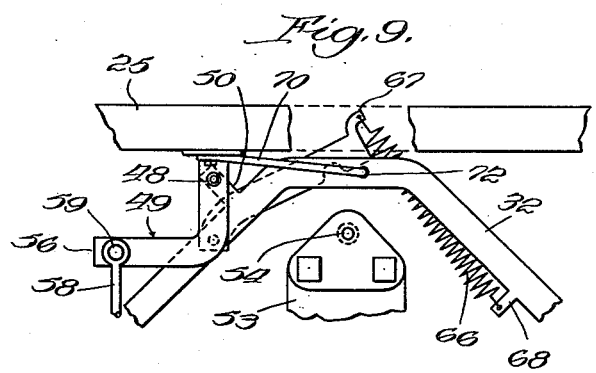
Inventor:
Hiram P. Smith.
By Paul O. Pippel.
Atty.

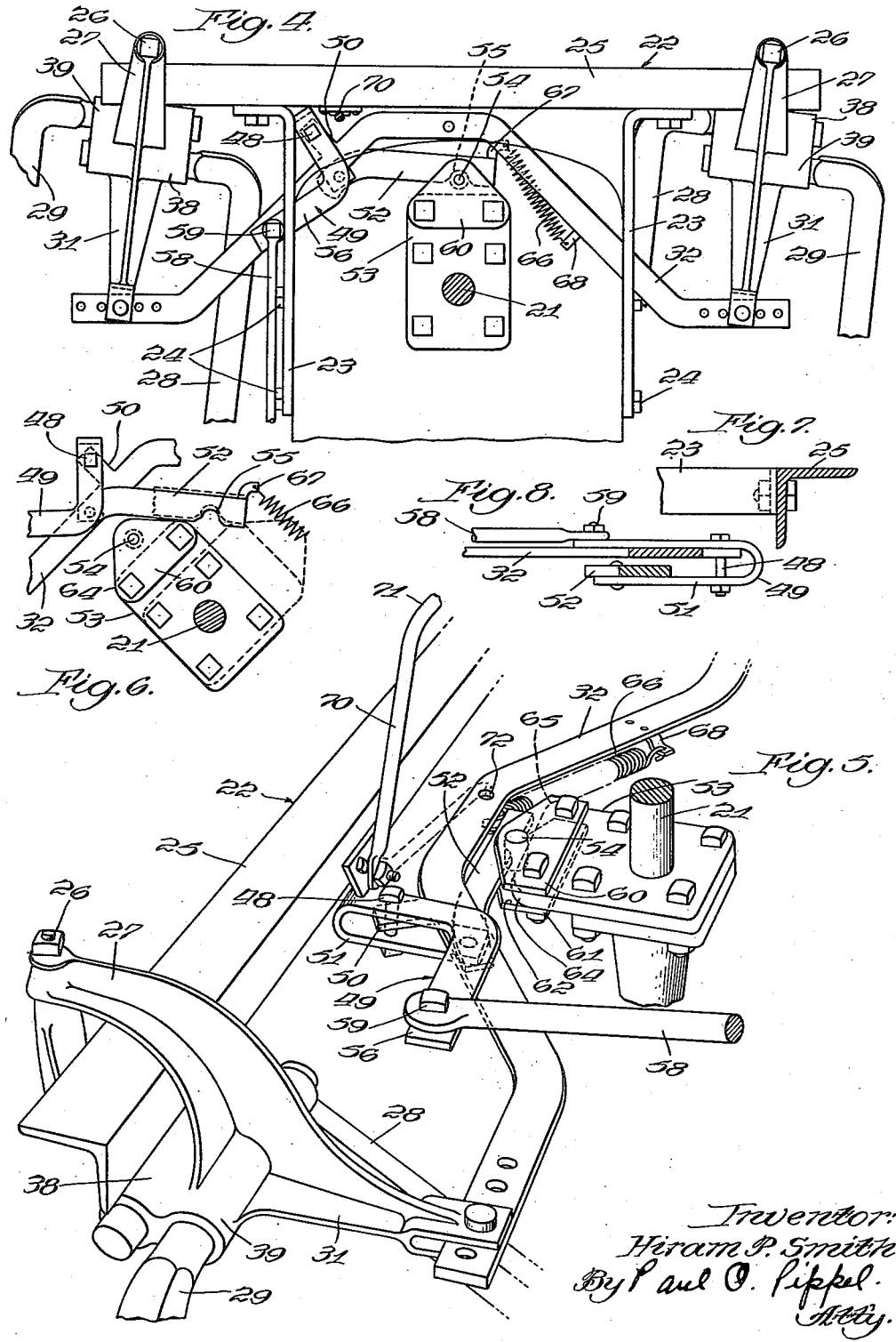

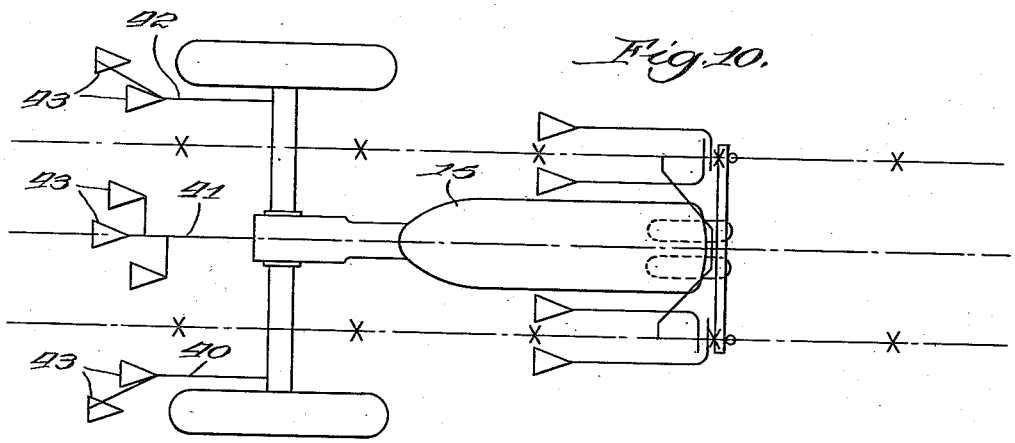
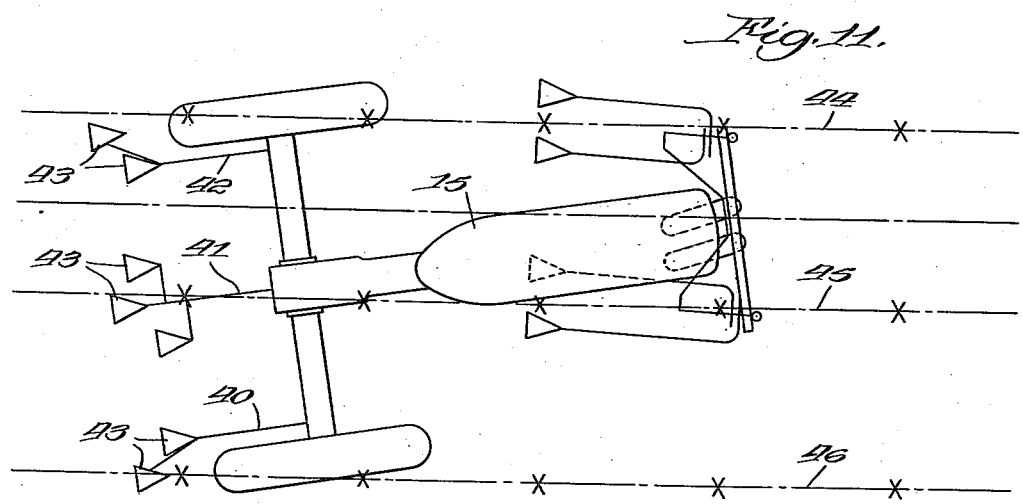
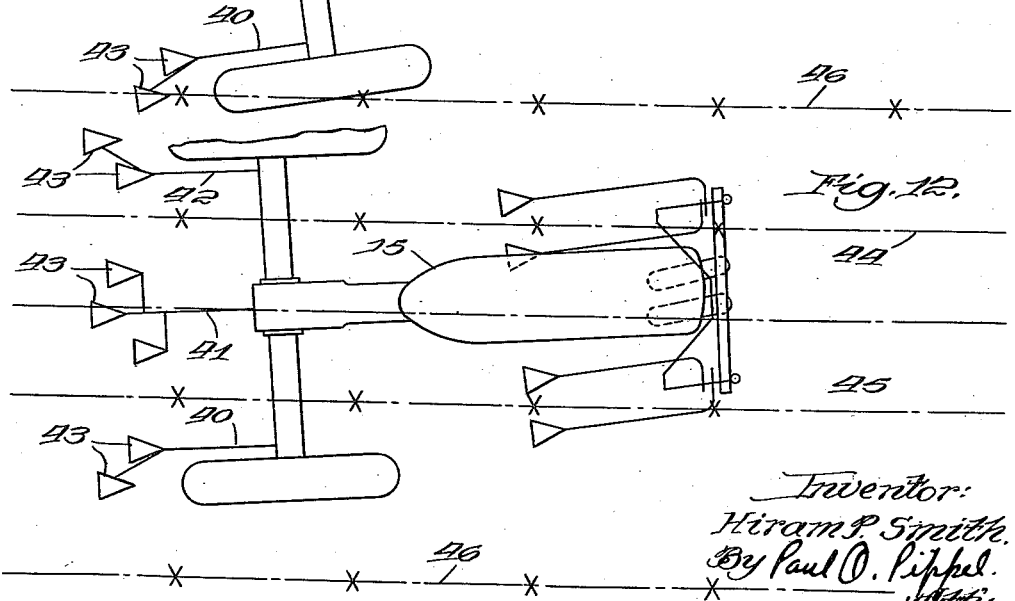

Patented Feb. 15, 1944

2,341,824

UNITED STATES PATENT OFFICE 2,341,824

TRACTOR-MOUNTED IMPLEMENT

Hiram P. Smith, Canton, Ill., assignor to International Harvester Company, a corporation of New Jersey Application October 22, 1941, Serial No. 416,033

15 Claims. (Cl. 97—47)

This invention relates to tractor-mounted implements and more particularly to tractor-mounted cultivators, wherein the working tool rigs thereof are connected to the tractor for lateral shifting movement mainly for the purpose of effecting plant-dodging of the row crops during cultivation, the working tool rigs being connected with the steering mechanism of the tractor to effect shifting movement of the rigs.

With the usual cultivator attachments of the shiftable rig type, it becomes necessary that the forward portion of the tractor carry rigs provided with a minimum number of working tools, leaving it necessary to have tools of the rear rigs in addition to the regular track sweeps for insuring complete cultivating of the crop rows. By having minimum working tools on the forward rigs of the tractor, that is, the rigs which are shifted by the tractor steering mechanism, the shifting is effected more easily than if additional tools were connected to the forward rigs which would require greater force of the operator to steer the added weight provided by these additional working tools. Where the tractor and the cultivator attachment are to be operated on level ground, such arrangement of tools appears to be satisfactory, but, where the tractor is to operate to cultivate on a side hill, there is considerable slipping of the same and the tractor necessarily has to be angled in order to keep it on the side of the hill, the angling effect being such that the extended working tools on the rear portion of the tractor are angled out of the space between the rows and into the row crops, thereby digging and mutilating large portions of the crop row. One way to overcome this objection has been to take the tools from the rear rigs of the tractor and add them to the forward rigs, but this, as will be apparent, causes a hardship on the operator in that the additional forward weight makes steering difficult.

It is, therefore, an object of the present invention to provide an arrangement wherein the working tools may be kept in their usual positions on the rear rigs and that the general arrangement of the cultivating rigs, which are adaptable for cultivation on level ground, may be kept when cultivation is to be made on unlevel ground or side hills.

It is another object of the invention to provide in a cultivator of the shifting rig type means wherein the forward cultivator rigs may be laterally displaced for proper alinement with the crop rows when the tractor is being used on side hills and wherein this means can be adjusted by the operator from the operator's station as the side hill irregularities of the ground are met with during the cultivating operation.

It is another object of the invention to provide a novel disconnecting clutch for cultivators of the shifting rig type and one which is operable to be automatically disengaged as the tractor is being turned in one direction or another, such as at the end of the crop row for return of the tractor over adjacent crop rows in the return direction.

It is another object of the invention to provide in a cultivator of the shifting gang type an arrangement of one of the clutch elements whereby the same may be locked out of engagement when the cultivating rigs are locked against lateral shifting movement for the purpose of being transported, the lock means thereby being common for both the cultivating rigs and for the clutching element from the part of the clutching mechanism in the connection of the cultivating rigs with the steering mechanism of the tractor.

In accordance with the present invention there is provided in the connection of the cultivating rigs with the steering mechanism a lever element adapted to be adjusted by a manual adjusting mechanism located at the rear portion of the tractor adjacent the operator's station. This lever element is a part of the connection of the cultivating rigs with the steering mechanism and, as it is operated, the cultivating rigs will be shifted laterally to the right or left with respect to the steering mechanism and to the tractor. By being able to so adjust the forward rigs, they can be brought into proper alinement with the crop rows so that the rear cultivating rigs take their proper positions in the space between the rows and, at the same time, allow the tractor to be angled for maintaining itself on the side hill. As the operator encounters a side hill, the forward cultivating rigs are merely adjusted downwardly, thus allowing the tractor rear wheels and the rear cultivating rigs to be set laterally upwardly onto the side hill in proper location for the rear cultivating rigs to be properly alined. The lever element is connected to the steering column on the forward part of the tractor by a clutch part adapted for clutch engagement with a second clutch part formed on the steering column. The engagement of the first clutch part and the formation of portions on the steering column is such that, when the steering column is turned to turn the tractor, the first clutching part will, if the turning movement is sufficient, be engaged by the portions and positively forced out of engagement with the second clutching part on the steering column. This operation automatically frees the cultivating rigs as the tractor is turned at the end of the field, thereby ridding the operator of the necessity of using energy to steer the cultivating rigs when the tractor is being turned at the end of the field. The cultivating rigs are located at opposite sides of the tractor and are interconnected by a connecting element, and this connecting element supports the pivoted lever, and the pivoted lever in turn supports the clutching part. The connection of the cultivating rig with the tractor is by means of a transverse draft means, which is stationary with respect to the tractor and which carries a locking element. The arrangement of the clutching part and the interconnecting link structure is such that, when the locking element on the transverse beam is moved into position, the interconnecting link structure and the clutching element may be simultaneously locked. When these parts are locked with respect to the tractor, the steering mechanism is free of the same and the rigs can be conveniently transported without swinging into the sides of the tractor.

For other objects and for a better understanding of the invention, reference may be had to the following description taken in connection with the accompanying drawings, in which:

Figure 2 is a plan view of the tractor and of the same cultivating attachment embodying the features of the present invention;

Figure 4 is a plan view similar to the view shown in Figure 3 but with the manual shifting lever having been operated to a position to laterally shift the cultivator rigs with respect to the steering mechanism;

Figure 5 is an enlarged perspective view of the cultivator attachment and of the lever and clutching parts forming the principal features of the present invention;

Figure 6 is a detailed plan view, showing the position of the clutching part after the steering column has been turned to release the same;

Figure 7 is a detailed view of the draft beam structure taken along the line 7—7 of Figure 3;

Figure 8 is a detailed view in elevation of the pivoted lever and the connections therewith as taken along the line 8—8 of Figure 3;

Figure 9 is a detailed plan view, showing the locking element in place for securing the interconnecting link structure and the clutching part with respect to the transverse beam;

Figure 10 is a more or less diagrammatic view of a tractor and of the cultivating rigs as they are positioned when cultivation is being made on level ground;

Figure 11 is a similar view of the tractor when cultivation is being attempted on inclined ground with the tractor being angled to maintain itself on the hillside and illustrating the destruction of the row crops by the rear cultivating rigs; and Figure 12 is a similar view of the tractor and cultivating rigs on a hillside after the forward cultivating rigs have been shifted downwardly by means provided in the present invention to allow the rear portion of the tractor to be set over into proper alignment with the row spacings for the proper locating of the rear cultivator tools.

Figure 1:
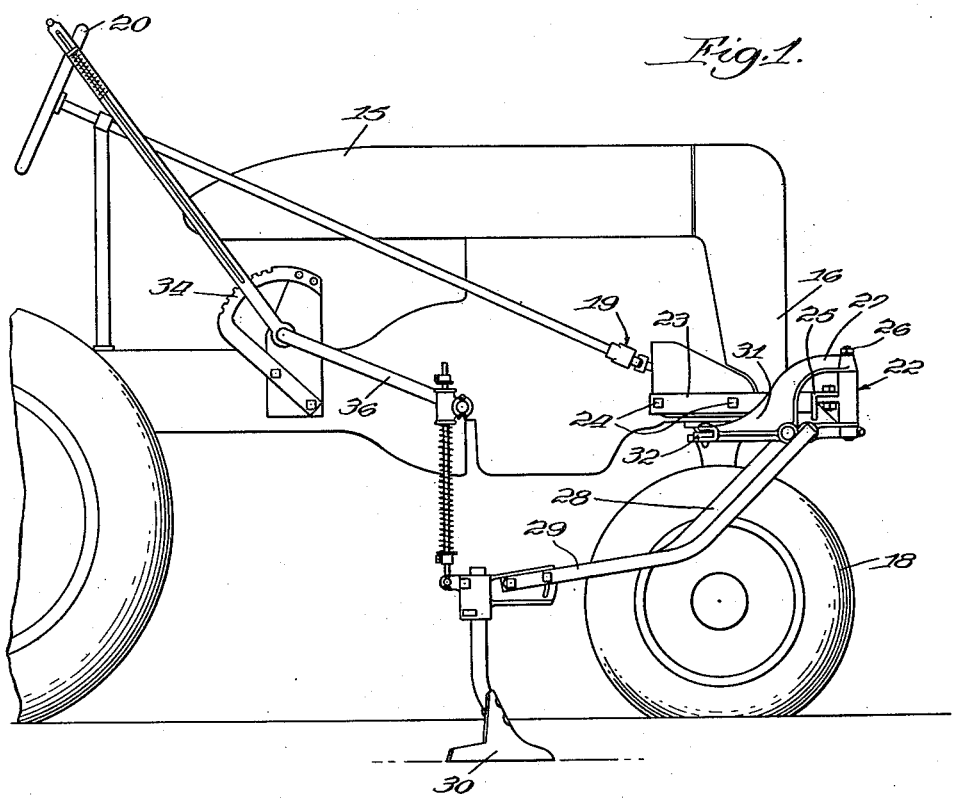
Figure 1 is an elevational view of a tractor with the cultivating attachment thereon.

Referring now particularly to Figures 1 and 2, there is shown a tractor 15 having a forward portion 16 and a rearward portion 17 with an operator's station 18' thereon. The forward portion 16 of the tractor is supported on dirigible wheels 18 adapted to be steered by a steering mechanism, indicated generally at 19, and including a hand wheel 20 accessible to the operator's station 18' on the rear portion of the tractor. The connection of the dirigible wheels is had with the steering wheel by means of a vertically extending, axially rotatable steering column 21.

Connected to the forward portion of the tractor is a cultivating attachment 22 of the shifting rig type and embodying the features of the present invention. The connection of the attachment with the forward portion of the tractor is made by means of straps 23 fixed to the tractor by fastening bolts 24. These straps 23 carry the transversely extending tool beam 25, which extends respectively beyond the opposite sides of the tractor to a location where there is pivotally connected for lateral swinging movement, as indicated respectively at 26, castings 27. Each of these castings 27 has pivotally connected thereto for vertical movement a pair of vertical swinging working tools or cultivating rigs 28 and 29. To each of these cultivating rigs is attached a working tool 30. These cultivating rigs extend rearwardly from the transverse beam 29 and along the sides of the tractor. Each pair of rigs is arranged to straddle a crop row. The transverse beam 25 and the straps 23 serve as means for attaching the cultivating rigs to the tractor.

The castings 27 have respectively rearwardly extending portions 31 which are connected together by means of an interconnecting link structure 32 that extends transversely across the forward portion of the tractor. It should thus be apparent that, by means of this interconnecting link structure, the pairs of cultivating rigs at opposite sides of the tractor are laterally shiftable as a unit.

Intermediate the forward and rearward portions of the tractor and midship of the same, there are mounted at each side thereof manually adjusting mechanisms 34 and 35 having manual levers extending rearwardly to be accessible to the operator's station 18'. To these manual levers are connected respectively at opposite sides crank arms 36 and 37 which are respectively attached to the pairs of cultivating rigs at opposite sides of the tractor. By means of these manual adjusting mechanisms it will be apparent that the cultivating rigs can be lifted out of ground-working position into an elevated position for transport on the tractor, the respective cultivating rigs 28 and 29 being pivotable to the castings 27, as indicated respectively at 38 and 39. By having separate manually adjustable mechanisms 34 and 35, one pair of cultivating rigs may be adjusted independently of the pair of cultivating rigs at the opposite side of the tractor.

Referring now particularly to Figure 10, it will be noted that the cultivating attachment, in addition to the attachment at the forward portion of the tractor, includes the connection with the rearward portion of the tractor, all rear cultivating rigs 40, 41, and 42 having respectively a plurality of cultivating tools 43 connected therewith. For cultivation on level ground, such an arrangement of cultivating tools has considerable advantage, since a considerable amount of cultivation of the space between the crops rows is done by the rear cultivating tools. By having the majority of the working tools on the rear rigs, the cultivating tools on the forward rigs need be only a minimum of one cultivating tool per rig. Such an arrangement of cultivating rigs and tools has not been readily adaptable for cultivation on unlevel ground, such as hillsides where it is necessary to keep the tractor angled in order to maintain the working tools in proper alinement for cultivation by means of the forward cultivating rigs.

Upon referring to Figure 11, it will be noted that the tractor 15 is considerably angled in order to keep the forward cultivating rigs on the crop rows 44 and 45. As a result of this angularity of the tractor, the working tools 43 of the rear cultivating rigs 40 and 41 are respectively thrown downwardly into alinement with the crop rows 45 and 46. If this operation continues, the rows 45 and 46 will be deleted. Also, it will be seen in this Figure 11 that the rear tractor wheels slide downwardly into alinement with the crop rows.

Figure 3:
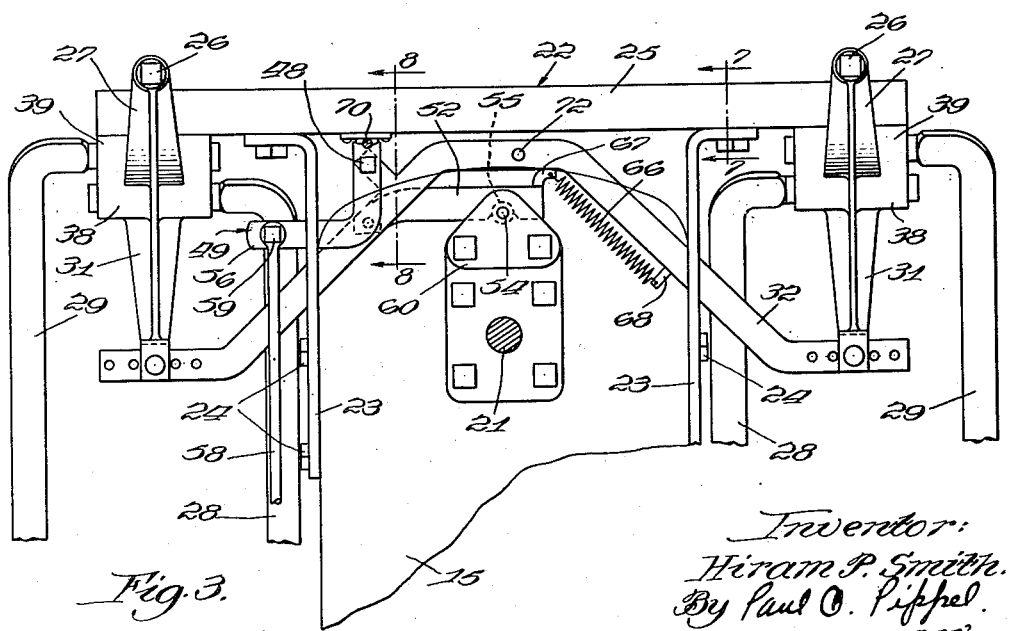
Figure 3 is an enlarged plan view of the cultivating attachment illustrating more clearly its connection with the tractor steering mechanism.

Referring now particularly to Figures 3, 4, 5, and 6, there is shown pivoted on the interconnected link structure 32, as indicated at 48, a pivoted lever 49. On the link structure 32 is a forwardly extending projection 50 to which connection of the lever is made with the link structure 32. The pivoted lever 49 has a downwardly folded portion 51 which extends rearwardly from the point of pivot 48, as is seen more clearly in Figures 5 and 8. This portion 51 forms an arm to which is connected a clutching part 52, which extends laterally from engagement with a forwardly extending projection 53 on the steering column 21. The forwardly extending projection arm 53 has a vertically extending clutching pin 54 adapted to be received in a recess 55 of the clutching part 52. The pivoted lever 49 has an angled portion 56 to which is connected a manually adjustable mechanism 57 on the rear portion 17 of the tractor and accessible to the operator's station 18. The connection of the manually adjustable mechanism 57 is made by means of a forwardly extending link element 58 connected to the angled portion 56 of the lever 49, as indicated at 59. This manually adjustable mechanism serves to provide the lever 49 about its pivot 48 on the interconnected link structure 32. With the clutching part 52 in engagement with the clutch pin or part 54 on the projected arm 53, it will be apparent that as the lever is rocked the link structure 32 will be adjusted with respect to the steering mechanism or arm 53 forming a part thereof. This lateral movement of the link structure 32 will cause the pairs of links to be laterally shifted in one direction or another with respect to the sides of the tractor. If the cultivating rigs are shifted from a neutral position, such as shown in Figure 3 to the left, they may assume a position such as shown in Figure 4.

By shifting the cultivating rigs to the right, it will be apparent on referring to Figures 11 and 12 that the left hand cultivating rigs can be brought closer to the left side of the tractor to allow the tractor to be moved laterally up-hill so that the rear wheels of the tractor will travel in the spacing between crop rows, as illustrated in Figure 12, thereby bringing the rear cultivating rigs and their accompanying working tools into proper alinement for cultivation of the spacing between the crops rows. It will also be apparent that this adjusting and shifting of the forward cultivating rigs is accomplished while the tractor is in operation and that the adjustment may be made in varied amounts, depending upon the amount of slip of the tractor on the hillside. If the hillside is upwardly to the right instead of to the left, the cultivating rigs may be positively adjusted to the left, as shown in Figure 4. This adjustment of the cultivating rigs with respect to the steering mechanism does not separate the rigs from the steering mechanism, and the steering mechanism is still available for the plant-dodging of the crop rows.

Referring now particularly to Figures 5 and 6, there will be described the automatic declutching feature of the present invention. It will be noted that the clutching pin or part 54 is fastened to the projecting arm 53 by means of a pair of plates 60 and 61. These plates 60 and 61 provide a recess 62 located at the outer end of the arm and adapted to receive the clutching part 52. At the bottom of the recess there is provided a corner portion 64 at the left side, and a corner portion 65 at the right side. These corner portions serve to disengage the clutching part 52 from the clutch pin 54 when the steering column 21 is turned sufficiently, as when it is desired to turn the tractor at the end of the field. By throwing the clutch part 52 out of engagement and against the action of a spring 66 fastened to the clutching part, as indicated at 67, and to the link structure 32, as indicated at 68, the rigs are automatically freed of the tractor steering mechanism, thereby permitting the operator to swing the tractor for operation over the field in the reverse direction. As illustrated in Figure 6, where the tractor is to be steered to the left for effecting a left turn, the corner portion 65 is engaged with the clutching element 52 to throw the same out of engagement with the clutching pin 54. The cultivating rigs have thereby been freed of the steering mechanism. If the projecting arm 53 is rotated to the right to effect a right turn of the tractor, the corner portion 64 would come into play to disengage the clutching part 52. It should now be apparent that there has been provided an arrangement for releasing the laterally shiftable cultivator rigs which is effective automatically by the steering mechanism of the tractor.

Referring now particularly to Figures 5 and 9, there is illustrated a means for locking the cultivating rigs and the clutching part 55 to the transverse beam 25, as when it is desired to transport the cultivating rigs in their elevated positions. On the transverse beam 25, and pivoted for downward swinging movement, is a locking element or arm 70 having a bent portion 71 adapted to fit within a hole 72 in the link structure 32. This projection 71 is sufficiently long to extend considerably below the link structure 32, so that, if the clutching part 52 is swung forwardly sufficiently, the same will thereby be retained in its forwardly extending position by the projection 71 in a manner illustrated more clearly in Figure 9. These manipulations of the arm 70 and of the clutching part 52 are accomplished manually, and, likewise, when the cultivating attachment is being operated, and in order that engagement can be made with the steering mechanism, the locking mechanism 70 is manually swung upwardly to a position shown in Figure 5 and there retained out of the way from the link structure 32. It should now be apparent that there has been provided a locking means which is common to both the link structure 32 and the clutching part 52 to simultaneously retain the same as the cultivating attachment is being transported.

While various changes may be made in the detailed construction, it shall be understood that such changes shall be within the spirit and scope of the present invention as defined by the appended claims.

What is claimed is:

1. In combination, a tractor having a steering mechanism, a working tool rig, means for connecting the working tool rig to the tractor for lateral shifting movement, means for releasably connecting the working tool rig to the steering mechanism, and means responsive to turning of said steering mechanism for releasing said connecting means.

2. In combination, a tractor having a steering mechanism, a row crop cultivating attachment connected to the tractor and having a cultivating rig mounted thereon for lateral shifting movement, means for releasably connecting the cultivating rig to the steering mechanism to effect plant dodging of the row crop, and means for automatically releasing said connecting means in response to turning movement of said steering mechanism.

3. In combination, a tractor having a forward portion, dirigible wheels for supporting the forward portion of the tractor, a row crop cultivating attachment connected to the forward portion and having cultivating rigs located respectively at opposite sides thereof, said cultivating rigs having lateral swinging movement, a steering mechanism including a steering column connected with the dirigible wheels to effect steering of the tractor, means for releasably connecting the cultivating rigs to the steering column to effect plant-dodging of the row crop, and means for automatically disconnecting said connecting means in response to rotation of said steering column beyond a predetermined limit.

4. In combination, a tractor having a dirigible wheel, a row crop cultivating attachment connected to the tractor and having a cultivating rig adapted for lateral swinging movement, means for steering the dirigible wheel including a vertically extending column rotatable about a vertical axis, a laterally projected arm on the column having a clutching part, means for connecting the steering means with the cultivating rig including a linkage connected with the cultivating rig and including a second clutching part adapted to enter into clutching engagement with the clutching part on the laterally projected arm when the dirigible wheel is positioned for forward movement of the tractor, and means associated with the clutching parts and operable responsively to steerage manipulation of the steering means for releasing the clutching parts pursuant to steerage manipulation of the steering means beyond a predetermined limit.

5. In combination, a tractor having a dirigible wheel, a row crop cultivating attachment connected to the tractor and having a cultivating rig adapted for lateral swinging movement, means for steering the dirigible wheel including a vertically extending column rotatable about a vertical axis, a laterally projected arm on the column having a clutching part, means for connecting the steering means with the cultivating rig including a linkage connected with the cultivating rig and including a second clutching part adapted to enter into clutching engagement with the clutching part on the laterally projected arm when the dirigible wheel is positioned for forward movement of the tractor, and shoulder portions on the projecting arm adapted to coact with said second clutching part to force the latter out of engagement with the clutching part on the projecting arm as the steering column is operated to cause the turning movement of the tractor, one shoulder portion being effective as the tractor is turned in one direction and the other shoulder portion being effective as the tractor is turned in the opposite direction.

6. In combination, a tractor having a forward portion, a dirigible wheel for supporting said forward portion of the tractor, a transverse draft beam connected to the forward portion and extending to locations at the opposite sides thereof, working tool rigs respectively connected to the transverse beam at opposite sides of the tractor for lateral shifting movement, means for steering the dirigible wheel including a vertically extending steering column rotatable about its vertical axis and having thereon a projected arm rotatable therewith, said projected arm being provided with a clutching part and two shoulder portions respectively located at opposite sides of the clutching part, a link interconnecting the working tool rigs, and a second clutching part carried by the interconnecting link and adapted for clutching engagement with the clutching part on the projected arm, said second clutching part also adapted to be abutted by the respective shoulder portions as the tractor is turned in one direction or the other direction whereby the said rigs will be released upon turning the tractor.

7. In combination, a tractor having steering mechanism, a working tool rig, means for connecting the working tool rig to the tractor for lateral shifting movement, means for releasably connecting the working tool rig with the steering mechanism including clutching parts, and common means for locking one of the clutching parts out of engagement with the other of the clutching parts and the working tool rig against lateral shifting movement, whereby said working tool rig will be stabilized for transport and freed of the steering mechanism.

8. In combination, a tractor, a transverse draft beam connected to the tractor and extending to locations at opposite sides thereof, working tool rigs respectively connected to the transverse beam at opposite sides of the tractor for lateral shifting movement, a link structure interconnecting the working tool rigs and shiftable as a precedent to such lateral shifting of the tool rigs, steering mechanism for the tractor, a clutching part formed on the steering mechanism, a second clutching part on the link structure and adapted normally for clutching engagement with the clutching part on the steering mechanism, and common means for locking the link structure against shifting and locking the said second clutching part out of engagement with the first-mentioned clutching part, whereby the working tool rigs will be stabilized for transport and freed of the steering mechanism.

9. In combination, a tractor, a working tool rig connected to the tractor for lateral shifting movement with respect thereto, a steering mechanism, means for releasably connecting the working tool rig to the steering mechanism, means for disconnecting said rig from said steering mechanism in response to turning movement thereof and means for laterally adjusting the working tool rig with respect to the steering mechanism.

10. In combination, a tractor, a working tool rig connected to the tractor for lateral shifting movement with respect thereto, a steering mechanism, means for releasably connecting the working tool rig to the steering mechanism, means for disconnecting said rig from said steering mechanism in response to turning movement thereof, and means in the connecting means for laterally adjusting the working tool rig with respect to the steering mechanism.

11. In combination, a tractor, a working tool rig connected to the tractor for lateral shifting movement with respect thereto, a steering mechanism, means for releasably connecting the working tool rig to the steering mechanism to release the same therefrom when the steering mechanism is operated to effect turning movement of the tractor, said releasable connecting means including clutching parts, and means for laterally adjusting the working tool rig with respect to the clutching parts.

12. In combination, a tractor, a dirigible wheel for supporting one end of the tractor, means for steering the dirigible wheel including a vertically extending steering column, working tool rigs respectively located at opposite sides of the tractor, means for connecting the working tool rigs to the end of the tractor for lateral shifting movement, means for releasably connecting the rigs to the steering column to be shifted by the same, means for releasing said connecting means in response to operation of said dirigible wheel to turn the tractor and said connecting means including means for adjustably fixing the working tool rigs laterally relative to the steering column.

13. In combination, a tractor having forward and rearward portions, a dirigible wheel for supporting the forward portion of the tractor, working tool rigs respectively located at opposite sides of the tractor, means for connecting the working tool rigs to the forward portion of the tractor for lateral shifting movement, a link structure extending across the forward portion and between the working tool rigs, means for steering the working tool rigs including a vertically extending axially rotatable steering column connected to the dirigible wheel, a clutching part on the steering column, a lever pivoted on the link structure, a second clutching part pivoted on the lever, spring biasing means for normally maintaining the clutching parts in engagement with each other, an operator's station on the rearward portion of the tractor, manually operable means accessible to the operator's station for adjustably fixing said lever, whereby the working tools may be laterally adjusted with respect to the clutched parts of the steering means.

14. In a tool rig control apparatus for use upon a dirigible tool-carrying vehicle including a steering mechanism and a laterally adjustable rig for the attachment of a tool to the vehicle, the combination of a latch means connected with said steering mechanism for movement thereby in accordance with steerage manipulation of said mechanism, a linkage member operably connected with said rig to laterally adjust the same, a lever having three connecting points in spaced relation defining the vertices of a triangle, means pivotally connected with said lever at one of said points and connecting the lever to the linkage member, a latch member pivotally connected with said lever at a second of said points and pivotal about said point to and from latching relation with said latch means, spring means urging said latch member into said latching relation, manually operable control means connected with the lever at the third of said points for pivoting said lever about the second point thereof to laterally displace said linkage structure and the rig during latching engagement of the latch member with the latch means, and means responsive to steerage manipulation of the steering means beyond a predetermined limit to displace the latch member from latching relation with the latch means.

15. In a tool rig control apparatus for use upon a dirigible tool-carrying vehicle including a steering mechanism and a laterally adjustable rig for the attachment of a tool to the vehicle, the combination of rig adjusting means detachably connectable between said steering mechanism and said rig to cause such adjustment of the rig in accordance with steerage manipulation of the steering mechanism, and means responsive to steerage manipulation beyond a predetermined limit to detach such connection of the rig adjusting means.

HIRAM P. SMITH.